United States Patent [19]

Doyle et al.

[11] Patent Number: 4,688,049

[45] Date of Patent: Aug. 18, 1987

[54] CONTINUOUS INK JET PRINTING

[75] Inventors: James J. Doyle, Cambridge; Ammar Lecheheb, Newmarket, both of England

[73] Assignee: Domino Printing Sciences PLC, Cambridge, England

[21] Appl. No.: 872,288

[22] Filed: Jun. 10, 1986

[30] Foreign Application Priority Data

Jun. 11, 1985 [GB] United Kingdom ................ 8514751

[51] Int. Cl.[4] ............................................ G01D 15/18

[52] U.S. Cl. ........................................ 346/1.1; 346/75

[58] Field of Search .................................. 346/1.1, 75

[56] References Cited

U.S. PATENT DOCUMENTS 4,086,601 4/1978 Fillmore et al. ...................... 346/75
4,490,729 12/1984 Clark et al. .......................... 346/75
4,491,852 1/1985 Jinnai .................................. 346/75
4,533,925 8/1985 Tsao et al. ........................... 346/75

FOREIGN PATENT DOCUMENTS 0005844 12/1979 European Pat. Off. ........... 400/126

*Primary Examiner*—E. A. Goldberg
*Assistant Examiner*—Gerald E. Preston
*Attorney, Agent, or Firm*—Robbins & Laramie

[57] ABSTRACT

In a continuous ink jet printing method for printing multiple lines of print (13-15), raster of drops is produced in which the differential charge between drops printed on opposite sides of an interline gap (17,18) is increased in comparison with that between adjacent drops to be printed within a line (13-15). At the same time the number of guard drops is maintained the same or is reduced between the printable drops immediately adjacent to the interline gap, so that the distance between printed drops immediately adjacent to the interline gap is increased without increasing the number of drops in the raster.

6 Claims, 3 Drawing Figures

| CHARGE LEVEL | DOT POSITION | DROP NUMBER | CHARGE DIFFERENCE | NON-PRINTABLE |
|---|---|---|---|---|
| 254 | 21 | 56 | | |
| | | | 6 | 2 |
| 248 | 20 | 53 | | |
| | | | 8 | 3 |
| 240 | 19 | 49 | | |
| | | | 8 | 2 |
| 232 | 18 | 46 | | |
| | | | 7 | 2 |
| 225 | 17 | 43 | | |
| | | | 11 | 2 |
| 214 | 16 | 40 | | |
| | | | 6 | 3 |
| 208 | 15 | 36 | | |
| | | | 22 | 1 |
| 186 | 14 | 34 | | |
| | | | 10 | 2 |
| 176 | 13 | 31 | | |
| | | | 5 | 2 |
| 171 | 12 | 28 | | |
| | | | 12 | 2 |
| 159 | 11 | 25 | | |
| | | | 6 | 2 |
| 153 | 10 | 22 | | |
| | | | 12 | 2 |
| 141 | 9 | 19 | | |
| | | | 9 | 3 |
| 133 | 8 | 15 | | |
| | | | 22 | 1 |
| 111 | 7 | 13 | | |
| | | | 9 | 1 |
| 102 | 6 | 11 | | |
| | | | 9 | 1 |
| 93 | 5 | 9 | | |
| | | | 9 | 1 |
| 84 | 4 | 7 | | |
| | | | 10 | 1 |
| 74 | 3 | 5 | | |
| | | | 10 | 1 |
| 64 | 2 | 3 | | |
| | | | 9 | 1 |
| 53 | 1 | 1 | | |

CONTINUOUS INK JET PRINTING

The present invention relates to a continuous ink jet printing method in which a stream of ink droplets are electrostatically charged and then deflected by passage between differentially charged plates.

In such a method a continuous stream of droplets is produced and a regular series of droplets are used to print a plurality of columns in a matrix to define individual characters. In a given method a regular number of drops (or raster) are required for each column of the matrix, each raster comprising a number of printable drops and a number of non-printable so-called guard drops interspaced between the printable drops, the number of printable drops which are actually printed being varied appropriately for each column of each character matrix. Such a method will hereinafter be referred to as of the kind described.

Due to the complex nature of the equations of motion affecting the drops (due to the interaction of electrostatic, aerodynamic forces on and between the drops) guard drops are provided in between adjacent printable drops in order to reduce the amount of compensation in the charging strategy of the individual drops in the raster. When a particular printable drop in the raster does not require to be printed for a given column in the matrix, that drop remains uncharged, but guard drops are generally differentially charged to a relatively low percentage level of the charge on the immediately preceding printable drop in order to compensate for charges of opposite sign which are induced into the guard drops by the presence of the immediately preceding printable drop. Thus, for example, a guard drop may be charged to a level of about 10% of the charge of the immediately preceding printable drop and when an immediately preceding printable drop does not require to be printed and is therefore left uncharged, the following guard drop will not be deliberately charged.

There is an increasing requirement for the generation of multiple lines of print and in the past this has been met by providing plural printing heads and related apparatus. However, this is an expensive solution and therefore it is desirable to be able to print multiple lines of print from a single print head, but without undue loss of printing speed whilst maintaining print quality.

When printing multiple lines of print, a gap, known as the interline gap, has to be left between each line of characters, but in a conventional method, the raster used for printing multiple lines includes in the interline gap position a plurality of guard-drops or non-printable drops together with a number of printable (but not printed) drops in order to achieve the desired interline gap. However, this method requires a number of wasted drops in the raster to generate the interline gap and as the number of lines of print increases so, of course, does the wastage of drops and thus the time taken to print a particular column in the matrix. Character printing speed is therefore reduced.

To overcome these problems and in accordance with the present invention therefore a continuous ink jet printing method of the kind described, for printing multiple lines of print, comprises the step of producing a raster of drops in which the differential charge between drops printed on opposite sides of an interline gap is increased in comparison with that between adjacent drops to be printed within a line, whilst the number of guard drops is maintained the same or is reduced between the printable drops immediately adjacent to the interline gap, whereby the distance between printed drops immediately adjacent to the interline gap is increased without increasing the number of drops in the raster.

By this means, the interline gap does not include wasted printable (but not printed) drops thus reducing the overall number of drops in the raster and increasing the print speed.

For comparison purposes, to generate a three line print with each line comprising a seven drop column matrix, a conventional method requiring a 25 printable-drop raster using two guard drops per printable drop and including two wasted printable (but not printed) drops per interline gap, would require a total of 75 drops in the raster, whereas a method according to the present invention (having a 21 printable-drop raster) utilizing two guard drops per printed drop, would reduce the number of effectively lost drops per raster from 12 to 4, thus reducing the number of drops in the raster to 63 and giving an effective speed increase of 19% above the conventional method.

It will be appreciated that with an increase in the number of lines of print required the line of print requiring the most deflected drops has drops with substantially increased charge levels over those in the least deflected printed line, in turn generating increased repulsive forces between adjacent drops and greater errors in placement accuracy. Also, due to the effective separation between printable drops on either side of an interline gap, the drop immediately following the interline gap may tend to diverge toward the interline gap, the drop experiencing a high aerodynamic drag which tends to force it closer to the next printed drop thus increasing the repulsion force between the like charges on the printable drops and so causing greater divergence from the intended trajectory.

Preferably therefore, the number of guard drops in the interline gap is reduced and the number of guard drops immediately following the printable drop immediately following the interline gap is increased.

Preferably, in order to further minimize the number of drops in the raster, the groups of printable drops forming the respective lines of print have different numbers of guard drops between the printable drops.

One example of a method according to the present invention will now be described with reference to the accompanying drawings, in which.

Figure 1:
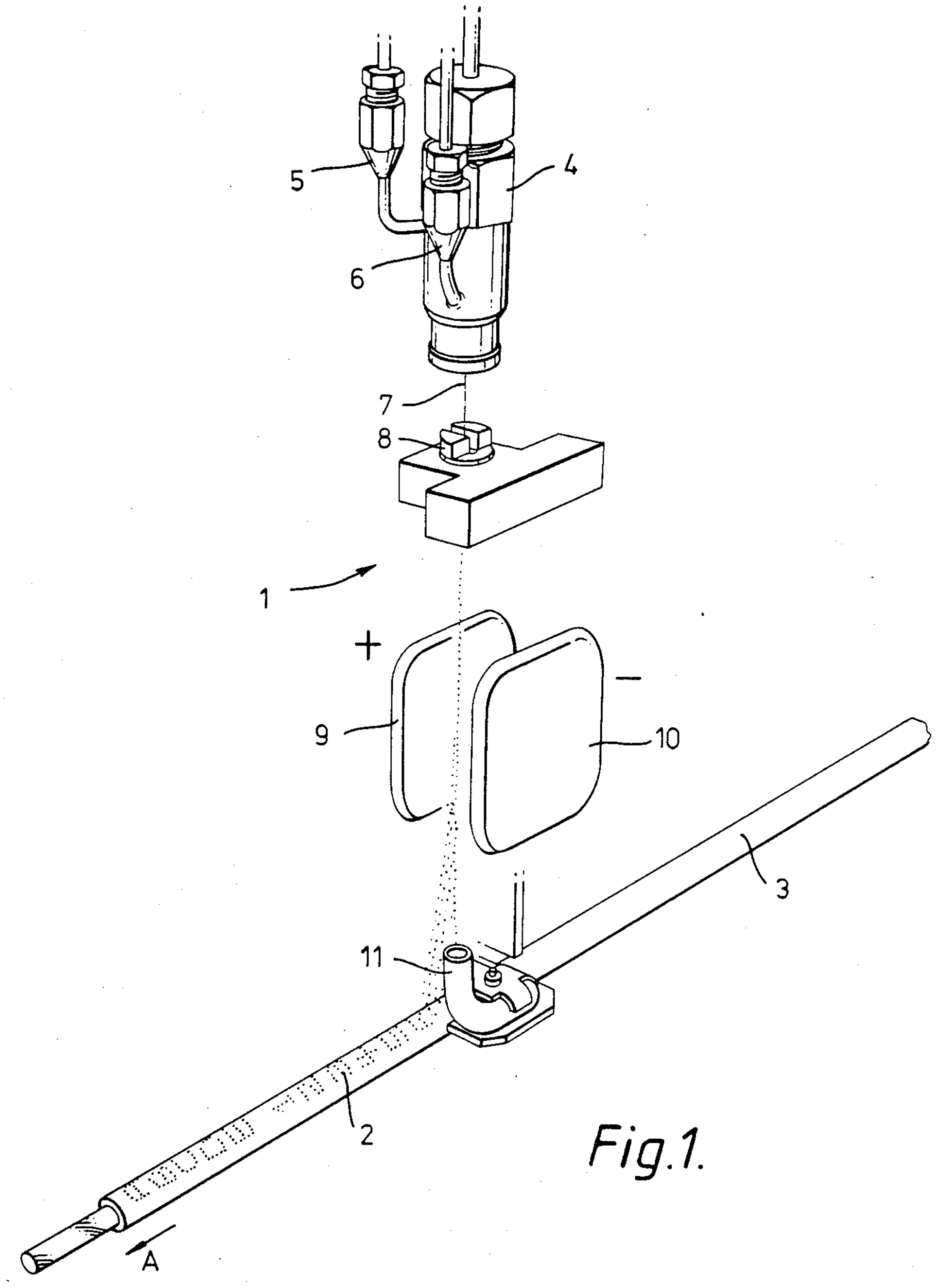
FIG. 1 is a diagrammatic perspective view of a conventional continuous ink jet printing head assembly.

FIG. 1 shows a conventional continuous ink jet printing head assembly 1, shown printing a single line of printed characters 2 onto insulated electrical wiring 3. The wiring 3 is fed continuously at a substantially constant velocity past the printing head 1 in the direction of arrow A.

In use, ink is fed to a nozzle assembly 4 from a source of pressurized ink (not shown) via an inlet coupling 5. A bleed coupling 6 is also provided for bleeding air from the system at shut down. The nozzle assembly 4 includes a piezo-electric oscillator (not shown) which vibrates in order to break up a stream of ink generated within the nozzle assembly into individual droplets which are then directed downwardly in stream 7. The droplets pass through a gap in a charge electrode 8 so that each droplet is charged in accordance with the position that it is to occupy in the raster and also dependent upon the character being generated. After passing through the charge electrode 8 the stream of droplets passes between a pair of deflector plates 9,10, the (negatively) charged droplets being deflected towards the positive plate 9 dependent upon their charge level, uncharged droplets continuing in the same direction and passing into a gutter tube 11 for subsequent return to the ink supply system.

FIG. 1 is a very much simplified diagrammatic perspective view of the head assembly, various parts having been omitted for clarity. In use the charge electrode is fed with an electrical signal phased in accordance with the phase of the droplets produced by the nozzle assembly 4 and varying as required to charge the various drops in the raster.

Figure 2:
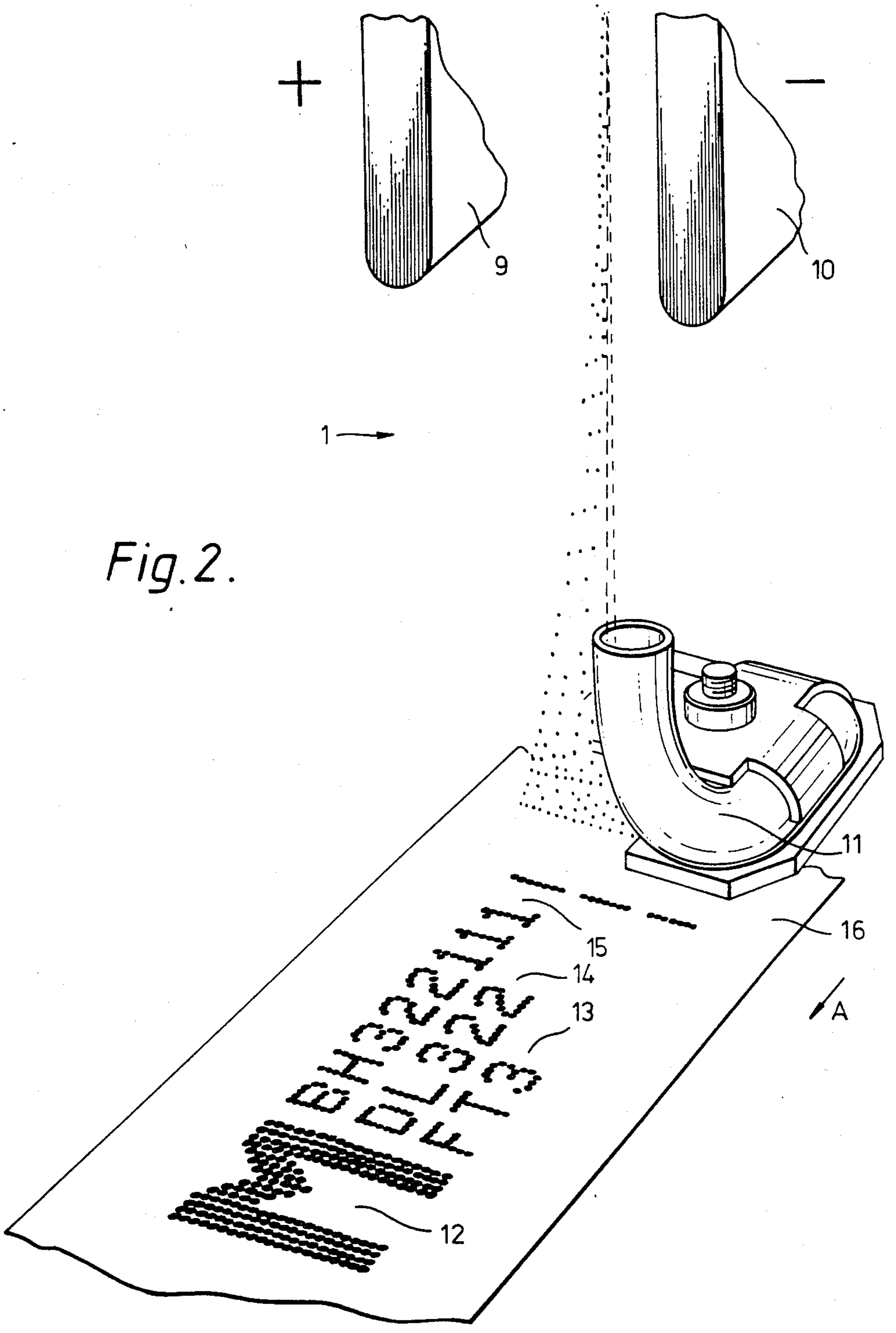
FIG. 2 is a diagrammatic perspective view of a portion of a print head assembly shown in printing according to the present invention; and, FIG. 3 is a combined diagram and chart illustrating printing according to the present invention.

FIG. 2 shows an enlarged perspective view of printing according to the present invention in which one large character size line of print 12 or three smaller character lines of print 13,14,15 are printed onto a substrate 16 moving in the direction of arrow A beneath the head assembly 1. The single line and the multiple line character each contain the same maximum number of printable drops, in the present case twenty one drops. In order to switch from printing a single line to multiple lines, the charging strategy by means of which the droplets are charged by the charge electrode 8 (FIG. 1) is changed by suitable control of the electrical charging system. In practice, messages to be printed are generated under software control and the charging strategy controlled accordingly by a microprocessor. Control of the charging strategy by this means is well known and will not be described in further detail as it is not of the essence of the invention just how the charge electrode is charged in turn to charge the droplets in the stream.

Figure 3:
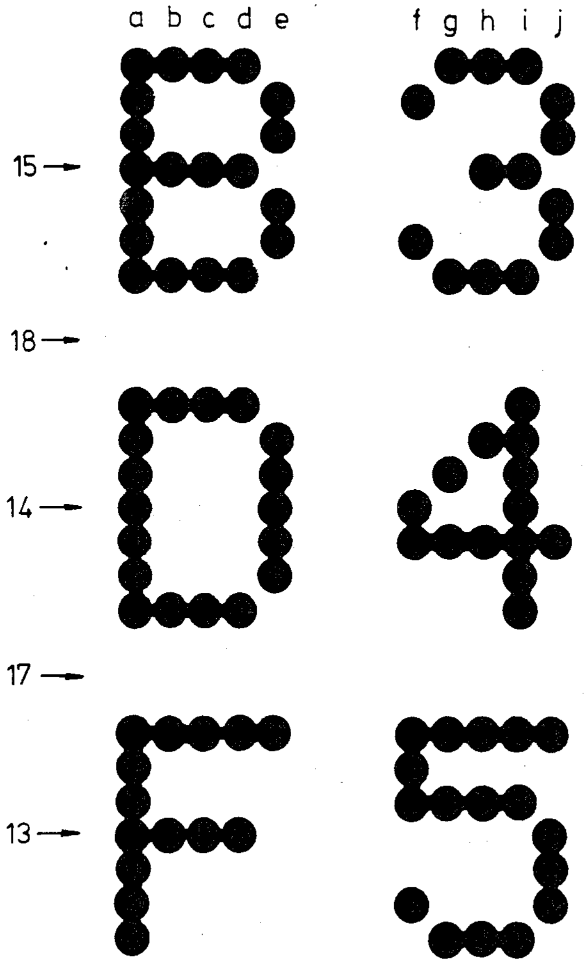

FIG. 3 shows three lines of print 13,14 and 15, each formed by columns of printed dots a–j. By comparing the different columns a–j it will be readily appreciated that the maximum number of drops actually printed in each column is twenty one, split evenly between the three lines of print.

In order to separate the three lines of print 13,14,15, it is necessary to generate interline gaps 17,18 so that the characters in the individual lines are clearly distinguished from one another.

To the right hand side of the printed characters are columns indicating the charge level on each droplet in column a, the number of the printed drop in column a, the number of the drop in the raster generated for the three lines of print, the difference in charge between adjacent printable drops and the number of non-printable or guard drops between each printable drop in the raster.

It can be seen from the figure that the total number of drops in the printable raster is 56, but in addition there are two further nonprintable, guard drops at the end of the raster which separate one column raster from the next. It will be appreciated therefore that the total number of drops in the raster is 58, a reduction, from the conventional norm or 75, of 17 drops, thus providing a resultant increase in character printing speed of nearly 30%.

From FIG. 3 it can be seen that the differential charge between adjacent drops printed on opposite sides of the interline gaps 17,18 is larger than that between adjacent drops printed within the lines 13,14,15, whilst, at the same time, the number of guard drops is either maintained the same (in the case of the first line of print 13 and first interline gap 17) or is reduced (in the case of the interline gap 18 in comparison with the line of print 14). The increased charge increases the distance between the drops on either side of the interline gaps 17,18 whilst enabling there to be no increase in the number of drops in the raster due to the presence of the interline gap.

During experimentation by the inventors, from the first approximation using two guard drops per printed drop and a total of 63 drops per raster, it was found that whilst print quality on the least deflected line 13 was extremely good, it was significantly lower on the most deflected line (15), predictably due to the increased charge levels on the most deflected line generating increase repulsive forces between adjacent drops and hence greater errors in placement accuracy. At the same time, the least deflected drop in lines 14 and 15 showed a strong tendency to diverge from the deflection axis toward the interline gap 17,18 respectively. Correct drop placement could be achieved up to a specific distance from the print head, but at must greater distances from the print head the placement error became unacceptable.

Consideration of the forces influencing the drop trajectory divergence indicated that both of these problems are substantially of an electrostatic nature. As adjacent drops in flight can be considered as being point charges and as the charges on adjacent drops are similar, the force between the charges can be considered as being proportional to the square of the charge difference and thus for a least deflected drop (drop number 1) having a charge voltage equivalent to approximately 50 V and a most deflected drop (drop number 21) having a charge voltage of approximately 250 V there is a charge ratio of minimum to maximum deflected drops of 5 to 1 and a ratio of forces of 25 to 1. Thus, drop placement accuracy (or print quality) decreases with increasing charge voltage. By reducing the guard drops on the least deflected line to one per printed drop the force between drops is increased, so reducing the force ratio between minimum and maximum deflected drops, enabling the same short range correction strategy to be used for all print lines, to provide the desired placement accuracy.

Furthermore, the least deflected drop of lines 14 and 15 is subjected to unbalanced electrostatic forces due to the different distances between adjacent printable drops on either side, the effect being exaggerated by the least deflected drop experiencing a high aerodynamic drag forcing it closer to the next printed drop and thus increasing the repulsive force and causing greater divergence from the intended trajectory. To balance the forces on either side of the drop the number of guard drops in the interline gap is reduced and, at the same time, the number of guard drops immediately following the least deflected printed drop in lines 14 and 15 is increased.

The reduction in total number of printable drops also lessens the problem associated with the compensation strategy required for long range aerodynamic masking effects to be overcome, by reducing the number of calculations required to be made by the microprocessor equipment normally employed for this purpose. The amount of drag experienced by a drop depends upon the pattern of drops flying in front of the reference drop.

Unlike electrostatic effects where only about 4 drops in front of the actual printing (or reference) drop can influence the latter, up to 30 drops in front of the reference drop have been found to contribute to printing error if not compensated for, due to aerodynamic forces or wake created by these leading drops. It is quite obvious that trying to compensate for even 15 drops in front of the reference drop is not only time and money consuming, but would also require a huge memory storage. In multiline printing according to this example the above problem is solved by the creation or the presence of the "permanent" interline gap. By devising a raster which consists of groups of printable drops (or a discontinuous scan), one is, in effect, dealing with "sub-rasters" inside the mother raster. In this way compensating for aerodynamic effects becomes simpler and quicker as only sub-rasters have to be considered as they can be taken as separate entities where the error introduced by the sub-raster has been compensated for by the provision of an extra guard drop between the leading and immediately following printable drop of the reference sub-raster.

We claim:

1. A continuous ink jet printing method in which a continuous stream of droplets is produced and a raster comprising a regular number of droplets is used to print each of a plurality of columns in a matrix to define individual characters, each raster comprising a number of printable drops and a number of non-printable guard drops interspaced between said printable drops, the number of said printable drops which are actually printed being varied appropriately for each column of each of said character, said method being adapted for printing multiple lines of characters, wherein the step of producing each said raster includes the steps of:

increasing the differential charge between drops printed on opposite sides of each interline gap in comparison with that between adjacent drops to be printed within a line; and, maintaining the number of guard drops at most the same between said printable drops immediately adjacent to each said interline gap;

whereby the distance between printed drops immediately adjacent to each said interline gap is increased without increasing the number of drops in said raster.

2. A method according to claim 1, wherein the number of guard drops between said printable drops immediately adjacent to each said interline gap is reduced.

3. A method according to claim 1, wherein the number of guard drops immediately following the drop to be printed immediately following each said interline gap is increased.

4. A method according to claim 1, wherein the groups of printable drops forming said respective lines of print have different numbers of guard drops between said respective printable drops, in order to further minimize the number of drops in the raster.

5. A method according to claim 1, in which three lines of print are printed.

6. A method according to claim 1, in which twenty one drops are printable in each said raster.

* * * * *